United States Patent
Demas et al.

(10) Patent No.: US 7,263,275 B2
(45) Date of Patent: Aug. 28, 2007

(54) SYSTEM AND METHOD OF MANIPULATING A SYSTEM TIME CLOCK IN AN AUDIO/VIDEO DECODING SYSTEM

(75) Inventors: Jason Demas, Irvine, CA (US); Marcus Kellerman, Aliso Viejo, CA (US); Sherman Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1101 days.

(21) Appl. No.: 10/174,385

(22) Filed: Jun. 18, 2002

(65) Prior Publication Data

US 2003/0165323 A1    Sep. 4, 2003

Related U.S. Application Data

(60) Provisional application No. 60/361,154, filed on Mar. 1, 2002.

(51) Int. Cl.
*H04N 5/91* (2006.01)
*H04N 7/12* (2006.01)
*H04N 7/173* (2006.01)

(52) U.S. Cl. .................. 386/68; 348/384.1; 348/423.1; 725/89; 725/100

(58) Field of Classification Search ................ 386/45, 386/46, 52, 68, 82, 98, 32, 111, 124, 125, 386/95; 348/384.1, 423.1; 725/89, 100
See application file for complete search history.

(56) References Cited

U.S. PATENT DOCUMENTS

| | | | |
|---|---|---|---|
| 5,740,307 A * | 4/1998 | Lane ........................... | 386/68 |
| 5,778,143 A * | 7/1998 | Boyce ......................... | 386/111 |
| 6,011,899 A * | 1/2000 | Ohishi et al. ................. | 386/98 |
| 6,031,960 A * | 2/2000 | Lane ........................... | 386/68 |
| 6,434,748 B1 * | 8/2002 | Shen et al. ................... | 725/89 |
| 6,587,635 B1 * | 7/2003 | Subramanian et al. ........ | 386/68 |
| 6,618,077 B1 * | 9/2003 | Baina et al. ................. | 348/192 |
| 6,621,979 B1 * | 9/2003 | Eerenberg et al. ............ | 386/68 |
| 2001/0036355 A1 * | 11/2001 | Kelly et al. .................. | 386/52 |

* cited by examiner

*Primary Examiner*—Thai Q. Tran
*Assistant Examiner*—Syed Y. Hasan
(74) *Attorney, Agent, or Firm*—McAndrews, Held & Malloy, Ltd.

(57) ABSTRACT

Systems and methods that manipulate a system time clock in an audio decoding system and/or a video decoding system are disclosed. In one example, the method may include the steps of selecting a trick mode rate and adjusting system time clock update rate as a function of the selected trick mode rate.

49 Claims, 8 Drawing Sheets

SYSTEM AND METHOD OF MANIPULATING A SYSTEM TIME CLOCK IN AN AUDIO/VIDEO DECODING SYSTEM

RELATED APPLICATIONS

This application makes reference to, claims priority to and claims benefit from U.S. Provisional Patent Application Ser. No. 60/361,154 entitled "Time-Base Management for MPEG Decoding with Personal Video Recording (PVR) Functionality" filed on Mar. 1, 2002. This application makes reference to, claims priority to and claims benefit from U.S. patent application Ser. No. 09/933,231 entitled "Apparatus and Method of Seamless Switching between a Live DTV Decoding and a PVR Playback" filed on Aug. 20, 2001. This application makes reference to, claims priority to and claims benefit from U.S. patent application Ser. No. 10/060,118 entitled "Error Concealment for MPEG Decoding with Personal Video Recording Functionality" filed on Jan. 29, 2002. This application makes reference to, claims priority to and claims benefit from U.S. patent application Ser. No. 09/951,693 entitled "Command Packets for Personal Video Recorder" filed on Sep. 11, 2001.

INCORPORATION BY REFERENCE

The above-referenced United States applications are hereby incorporated herein by reference in their entirety.

BACKGROUND OF THE INVENTION

A Personal Video Recorder (PVR) system offers consumers a hard disk or a network-based VCR that digitally records live television (TV) programs while offering the versatility of select playback and associated special features. Live sources for a PVR system include a live digital broadcast and a live analog broadcast.

It is desirable that the PVR system offer consumers a variety of trick modes that can exploit the use of the live and/or recorded programming. For example, it is desirable that the PVR system provide trick modes to consumers such as, for example, pause/still, fast forward, slow forward, rewind, slow reverse, skip, etc.

Further limitations and disadvantages of conventional and traditional approaches will become apparent to one of ordinary skill in the art, through comparison of such systems with the present invention as set forth in the remainder of the present application with reference to the drawings.

BRIEF SUMMARY OF THE INVENTION

Aspects of the present invention may be found, for example, in systems and methods that manipulate a system time clock in an audio/video decoder system. In one embodiment, the present invention may provide a method for providing a trick mode in a personal video recording system. The method may include the steps of selecting a trick mode rate and adjusting a system time clock (STC) update rate as a function of the selected trick mode rate.

In another embodiment, the present invention may provide a method for providing a trick mode in a personal video recording system. The method may include the steps of measuring depths of a buffer over a particular time period; determining differences between the measured depths of the buffer and a desired depth of the buffer; processing the determined differences; and modifying an STC update rate as a function of the processed differences.

These and other advantages and novel features of the present invention, as well as details of illustrated embodiments thereof, will be more fully understood from the following description and drawings.

DETAILED DESCRIPTION OF THE INVENTION

Figure 1:
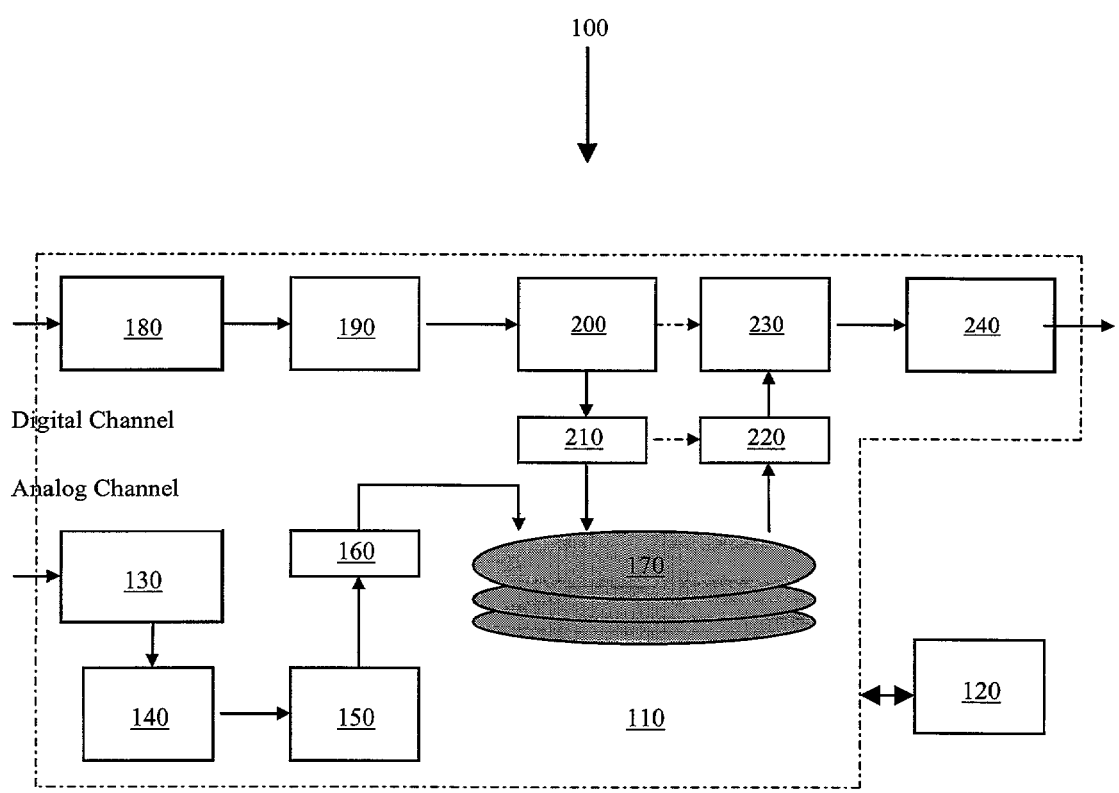
FIG. 1 shows an example of a personal video recorder (PVR) system according to the present invention.

FIG. 1 shows an example of a personal video recorder (PVR) system according to the present invention. The personal video recorder (PVR) system 100 may include, for example, a PVR module 110 coupled to a host processor 120. The PVR module 110 may include, for example, an analog demodulator 130, a video decoder (VDEC) 140, a moving pictures experts group (MPEG) encoder 150, a first-in-first-out (FIFO) buffer 160, a hard drive 170, a digital demodulator 180, a forward error correction (FEC) decoder 190, an MPEG data transport processor 200, a FIFO buffer 210, a FIFO buffer 220, an MPEG video decoder 230 and a display processor 240. The couplings and interactions between the various PVR system components and the operation of the PVR system are disclosed in the above-referenced incorporated applications and will not be described in detail herein. The scope of the present invention is not limited by the illustrated example. For example, the present invention is not limited to a hard drive, but may employ in addition to or instead of a hard drive any of the following examples: an optical storage device, a magnetic storage device, an electrical storage device, a network or combinations thereof. In addition, the present invention is not limited to the illustrated embodiment, but may also include, for example, other embodiments, parts or aspects thereof also disclosed in the incorporated applications. Thus, for example, the PVR system 100 may also include an audio buffer, an audio decoder and an audio output device which may or may not be integrated, at least in part, with corresponding video components. Furthermore, although the present invention may find applications as part of or in conjunction with a set top box, the present invention need not be so limited. The present invention may find application, for example, in the front end portion or the head end portion of a system or network. Thus, for example, the present invention may be employed in the head end portion of a video-on-demand server.

When a stream is being played back from a storage element, it can be played back with a variety of modifications, for example, to a configuration of a decoder or with various manipulations to the stream that may result in a trick mode appearance of the video or audio. Examples of trick mode features include fast forward or rewind of a stream that is being played from a storage element (e.g., a hard disk or a file server).

A host trick mode may be achieved, for example, if a stream can be manipulated after recording, but before playback by the host, and a decoder may be configured to decode the result as if it had not been altered at all. Some basic configuration elements (e.g., disabling continuity counter checking) may be configured to allow for decoding the resulting stream. In one example, only I-frames may be sent to a decoder while P-frames and B-frames may be dropped before playback. The host and, in particular, a host processor may provide a command packet into the playback stream that may be used to configure a decoder as a function of stream content to allow for more complex results from the stream manipulation.

A decoder trick mode may be achieved, for example, by configuring a decoder to decode differently than it normally would for a particular stream. For example, the decoder may be configured to display each decoded picture twice instead of just once, thereby resulting in a slow motion display at approximately half (½-times) the speed. The effect may also be achieved, for example, by employing a system time clock (STC) trick mode. An STC trick mode may manipulate the STC in a non-linear manner.

Although trick mode embodiments may be described in an orthogonal manner, they may coexist to support even more complex system level visual effects. For example, a 3-times host trick mode may be used in combination with a 2-times decoder trick mode that may result in a 6-times fast forward. Such a combination of trick modes may be smoother than a 6-times host trick mode fast forward, but without the computational overhead of a 6-times decoder trick mode.

In a host trick mode, a recorded stream may be manipulated by the host to create a visual effect of a trick mode. For example, pictures may be dropped cleanly in the stream to cause the visual effect of a fast forward. The basic data flow for host-based trick modes may be similar to a standard playback with a few differences, some of which are described below.

A difference between the data flow in a host-based trick mode and a standard playback may relate to timebase management. Since there may be no audio with which to synchronize, the video decompression engine may be configured to run without enabling timebase management. Thus, for example, a picture may be decoded as soon as it is received and may be displayed on the next available vertical sync. An advantage may be that the step of initializing a time stamp (e.g., presentation time stamp (PTS) or a decode time stamp (DTS)) or the STC may be avoided, for example, by the host.

Another difference may relate to continuity counter errors. Nominally, the data transport engine and the video decompression engine monitor the continuity counters in the transport stream to detect errors. However, since entire pictures may be dropped during some host trick modes, continuity counters may no longer be valid. Thus, the step of continuity count checking may be disabled during the playback in some host trick modes.

Another difference may relate to buffer management. When entering or exiting a host trick mode, it may be visually appealing to flush the video buffer so that the decoder may respond instantly to requests by the user. Special transport packets containing configuration information may be inserted into the manipulated stream by the host to configure the decoder in various dimensions during a host trick mode. These command packets may not be required for normal trick modes of nominal content, but may allow for more advanced processing with some styles of content.

Figure 5:
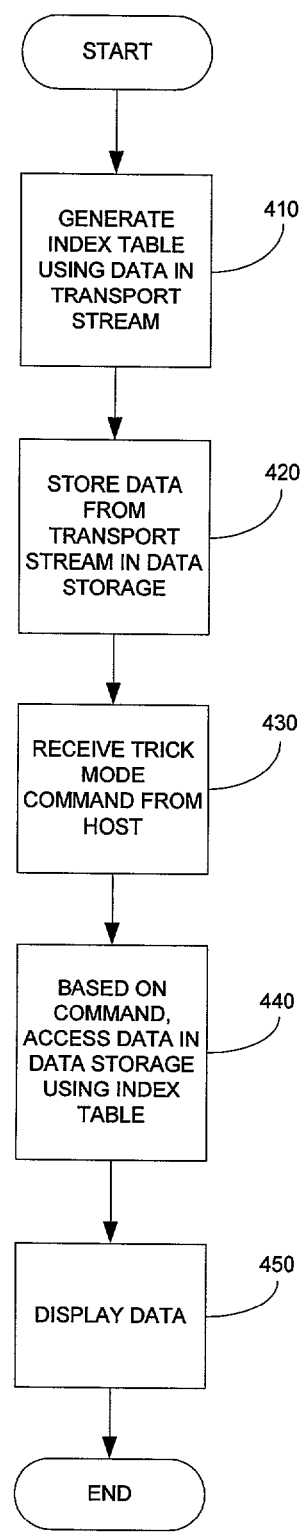
FIG. 5 is a flowchart illustrating an example of a process that provides a host trick mode according to the present invention.

FIG. 5 is a flowchart illustrating an example of a process that provides a host trick mode according to the present invention. In step 410, a transport stream is received and an index table is generated using data determined from the transport stream. The index table may provide information concerning, for example, the location of information from the transport stream that has been stored in data storage. In one example, the index table is created in real time during the recording of the transport stream in the data storage. In step 420, data from the transport stream is stored in the data storage. The index table may also be stored in the data storage. In one example, the transport stream and the index table are both stored in a memory (e.g., a unified synchronous dynamic random access memory (SDRAM) memory). The memory may include any of the following memory types: dynamic random access memory (DRAM), SDRAM, double data rate synchronous dynamic random access memory (DDR-SDRAM), extended data output dynamic random access memory (EDO-DRAM), rambus dynamic random access memory (RDRAM), etc. Information may be transferred between the memory and a storage element such as, for example, a file server or a hard disk via direct memory access (DMA) circuitry. In step 430, a trick mode command is received from the host. Subsequently, in step 440, based on the received command, data is accessed in the data storage using the index table. For example, the host may receive a command to retrieve only I-frames and only every other I-frame. Using the index table to locate every other I-frame, the host may facilitate passing every other I-frame from data storage to, for example, the video decoder while skipping or dropping other frames. In step 450, the video decoder may decode and display, for example, the received I-frames.

Figure 6:
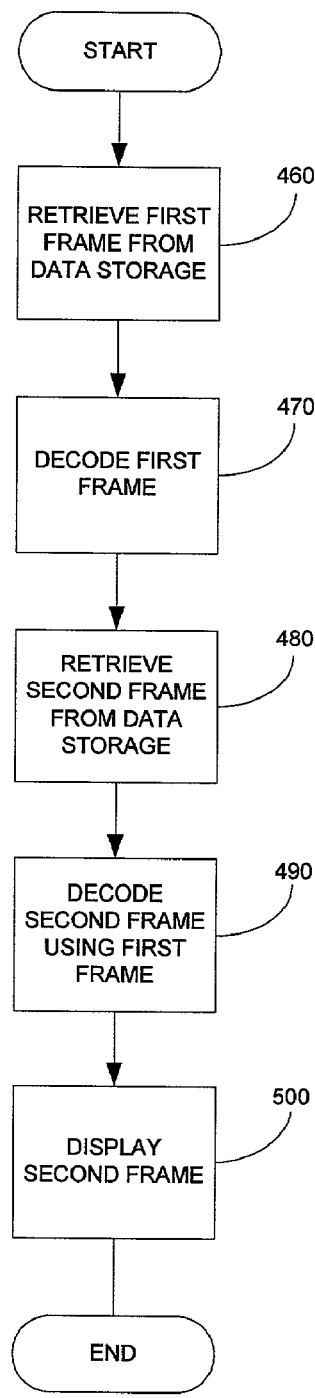
FIG. 6 is a flowchart illustrating an example of a process that provides a host trick mode according to the present invention.

FIG. 6 is a flowchart illustrating an example of a process that provides a host trick mode according to the present invention. Although applicable to digital broadcast environments, transport streams may also include, for example, program streams, packetized elementary streams or other elementary streams and the processes described herein may also be applicable to other environments (e.g., digital video disc or digital versatile disc (DVD), personal computer (PC), etc.) In some examples, the use of continuity counters may become less important in some environments than in other environments. In one example, transport streams may include different types of frames (e.g., I-frames, P-frames or B-frames). Thus, for example, I-frames may contain the most information. P-frames may be disposed between the I-frames and may be a function of the information contained in the I-frames. B-frames may be disposed between the I-frames and/or the P-frames and may be a function of the I-frames and/or the P-fames. Such a conventional configuration tends to improve compression of, for example, visual information without significant loss in the display quality. Thus, if the received command requests that, for example, a particular P-frame or B-frame be decoded and displayed, then the following process may occur. In step 460, a first frame is retrieved from the data storage. In step 470, the first frame is decoded. For example, if a particular P-frame is requested to be decoded and displayed, the I-frame from which is derived the particular P-frame is retrieved using the index table and decoded. In step 480, a second frame is retrieved from the data storage. In step 490, the second frame is decoded using the first frame. In one example, the particular P-frame is retrieved and decoded using the I-frame. In step 490, the second frame is displayed. The first frame may or may not be displayed depending upon the received command. In another example, if the requested frame is a B-frame, then the respective I-frame and/or P-frame may be retrieved and decoded for use in decoding the particular B-frame. The retrieved frames used to decode, for example, the B-frame may or may not be displayed depending upon the received command. Furthermore, the present invention contemplates that the process may be applied to a wide variety of applications other than the decoding and displaying of P-frames and B-frames.

Figure 2:
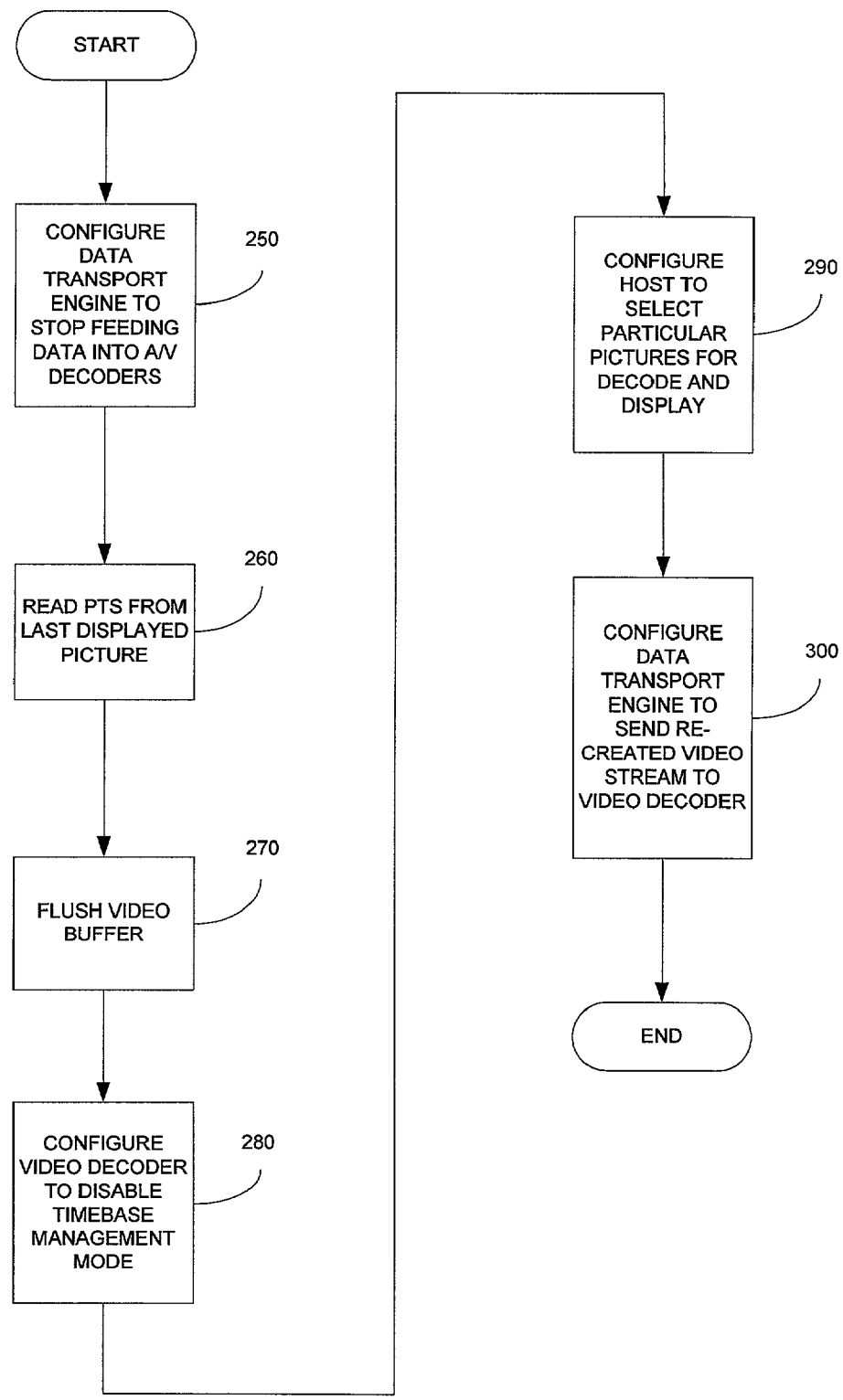
FIG. 2 is a flowchart illustrating an example of a process for entering a host trick mode according to the present invention.

FIG. 2 is a flowchart illustrating an example of a process for entering a host trick mode according to the present invention. In step 250, the data transport engine is configured to stop feeding data into the audio decoder and the video decoder. Thus, data is stopped from being fed into the playback channel. In step 260, the PTS is read from the last picture that the video decoder displayed. The present invention may also contemplate using the DTS instead of or in combination with the PTS. In one example, the DTS is used and the picture ordering is taken into account or considered. In step 270, the video buffer is flushed. In step 280, the video decoder is configured to operate with the timebase management mode disabled. In one example, the decode process begins with the video decoder configured to operate without timebase management since the timestamps in the stream may not be accurate during a host trick mode. In addition, the video decoder may be configured with the continuity counter verification disabled. If the video decoder is operating without timebase management, timebase discontinuities are not a substantial issue. However, if the timebase is being used to determine which particular picture to playback, then the host should monitor for timebase discontinuities.

In step 290, the host processor is configured to select particular pictures for playback. In one example, the host processor is configured to select particular pictures for decode and display as a function of, for example, the requested trick mode format, the PTS read from the video decoder and the contents of the index table of start codes. The host processor may use the PTS read from the video decoder as a guide as to where in the stream the playback should begin. The host processor may also employ the index table of start codes, which was created by the data transport engine during record, to determine where pictures are located in the buffer, which may be part of a unified SDRAM.

In step 300, the data transport engine is configured to send the recreated video stream to the video decoder. In one example, the data transport engine is configured to send the particular pictures selected by the host processor in a video stream to the video decoder. A playback engine may be configured to send pictures into the video decoder based on, for example, the type of trick mode selected.

Figure 3:
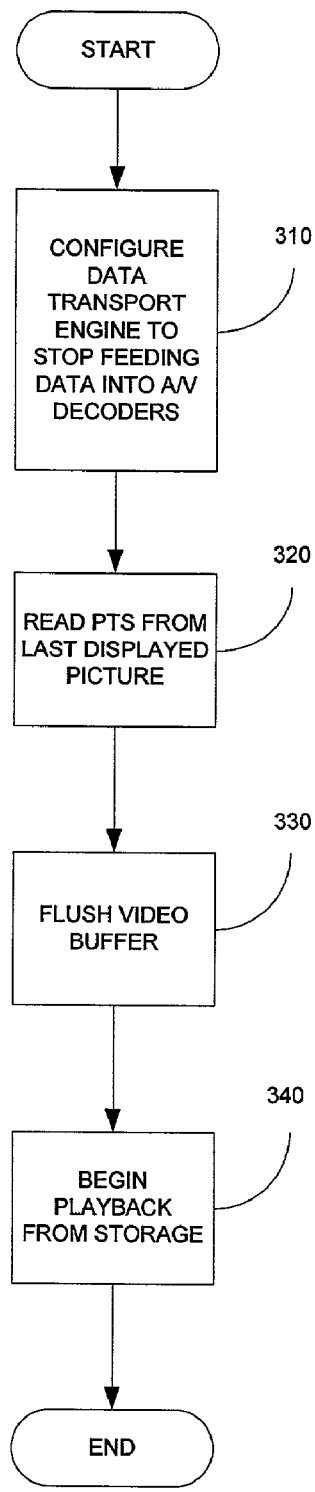
FIG. 3 is a flowchart illustrating an example of a process for exiting a host trick mode according to the present invention.

FIG. 3 is a flowchart illustrating an example of a process for exiting a host trick mode according to the present invention. In step 310, the data transport engine is configured to stop feeding data into the audio decoder and the video decoder. Thus, data is stopped from being fed into the playback channel. In step 320, the PTS is read from the last picture that the video decoder displayed. In step 330, the video buffer is flushed. In step 340, the playback from storage (e.g., disk) begins as described in more detail in the above-referenced applications that were incorporated by reference in their entirety. In one example, for seamless operation, playback may resume from the frame corresponding to the PTS that was returned from the video decoder. The continuity counter verification may also be enabled again.

Decode trick modes may be designed to implement trick mode functionality without the host directly manipulating the stream. In one example, to implement a particular decode trick mode, the decoder may be setup similarly as for a host trick mode, except that, for example, the continuity counters may remain enabled. The continuity counters may remain enabled since the stream is no longer being modified by the host.

Each of the decoder trick modes may take effect starting with the frame following the currently displayed frame. Leaving a decoder trick mode may also occur with the frame following the currently displayed frame. Once the stream is being decoded, the video decoder can be configured to support a wide variety of decode trick modes that may be implemented via, for example, the host. A few illustrative decode trick modes are listed below.

(1) Pause—The video decoder may be configured to stop decoding and to continue to display the last displayed picture.

(2) Frame advance—The video decoder may be configured to move one frame forward.

(3) Slow motion—The video decoder may be configured to display one frame every X vertical synchronization pulses, thus visually appearing in slow motion.

(4) Smooth fast forward—The video decoder may be configured to display Y frames every vertical synchronization pulse, thus visually appearing in smooth fast forward.

Figure 4:
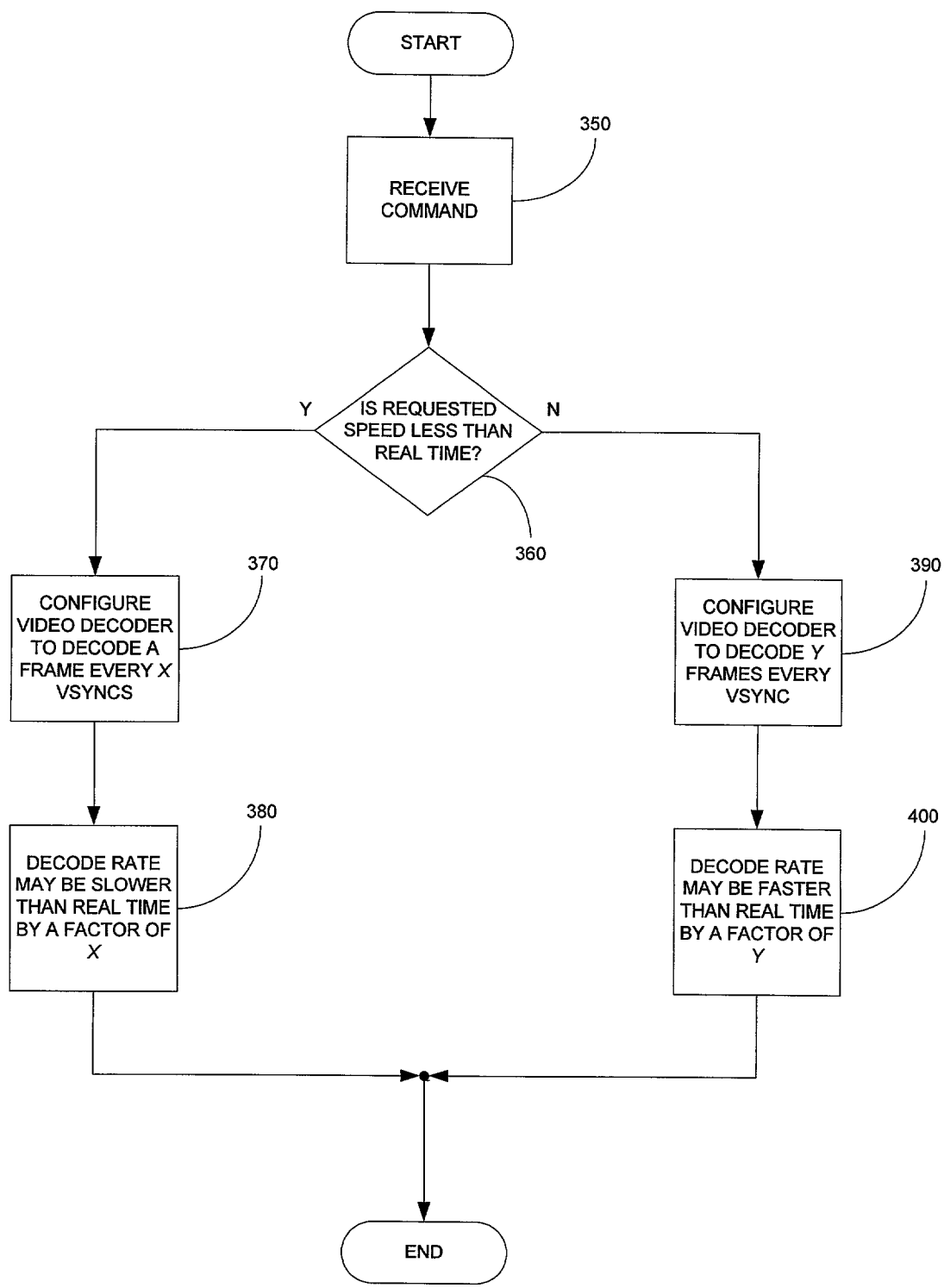
FIG. 4 is a flowchart illustrating an example of a process that provides a decode trick mode according to the present invention.

FIG. 4 is a flowchart illustrating an example of a process that provides a decode trick mode according to the present invention. In step 350, the video decoder receives a command indicating, for example, which decode trick mode to provide. This command may, for example, come from the host. In one example, the command may be command data contained, perhaps inserted, into a transport packet of the transport stream received by the video decoder. In query 360, the decoder determines whether the requested decode trick mode will display the frames at a rate that is slower than real time (e.g., a speed that is slower than normal-speed playback).

If the requested speed is less than real time, then the process jumps to step 370. In step 370, the video decoder is configured according to the command to decode a frame every X vertical synchronization pulses (vsyncs), where X is a positive number. In one example, the value of X may be determined from the received command. In another example, the value of X may be stored in the video decoder. The video decoder then decodes at a rate that may be slower than real time by a factor of X. Thus, in one example, the video decoder may generate 1/X-times slow motion. In fact, as the value of X increases, then the slow motion tends to become more and more like a pause.

If the requested speed is not less than real time, then the process jumps to step 390. In step 390, the video decoder is configured according to the command to decode Y frames every vsyncs, where Y is a positive number. In one example, the value of Y may be determined from the received command. In another example, the value of Y may be stored in the video decoder. In yet another example, X and Y may be the same variable. The video decoder then decodes at a rate that may be faster than real time by a factor of Y. Thus, for example, the video decoder may generate Y-times smooth fast forward.

For each of the above-described decoder trick modes, the video decoder may be programmed to display both fields or to display the top field only (e.g., repeat top field for both fields on the display). The programming of this mode may be active until the video decoder is programmed for another mode.

STC trick modes may contemplate real time linear or non-linear manipulation of the STC during decode to perform various trick modes. Some embodiments of STC trick modes do not require host involvement for stream processing. Thus, the entire stream may be sent into the audio decoder and/or the video decoder for processing. The data transport engine, video decoder and audio decoder may be configured almost as they are for host based trick modes. An example of a difference between the configurations may be that the continuity counter checking remains enabled for an STC trick mode. Since no stream manipulation occurs in the host, the continuity counters are still valid.

Figure 7:
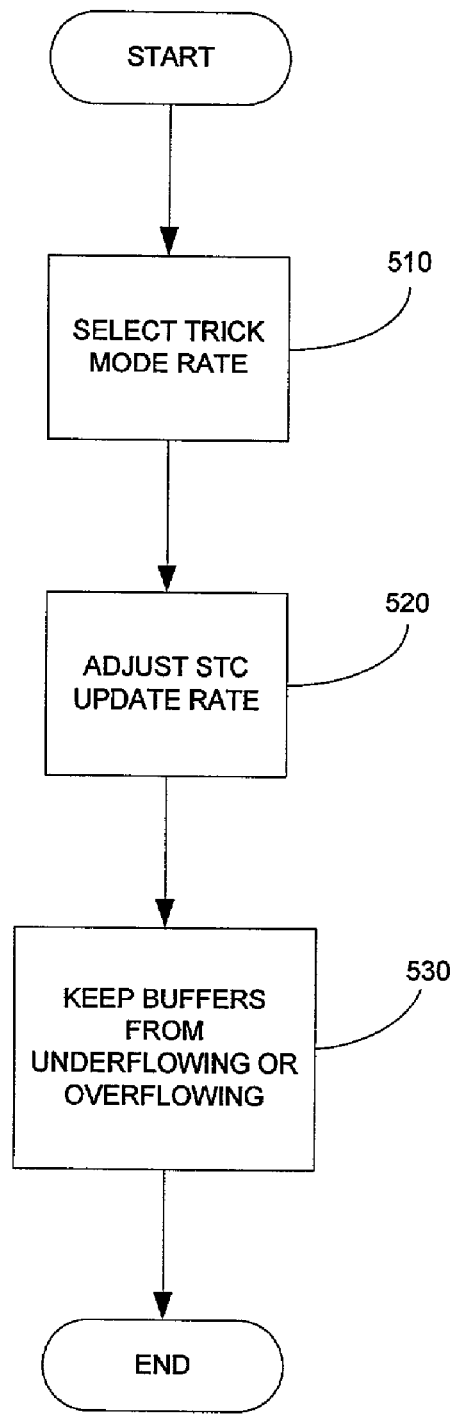
FIG. 7 is a flowchart illustrating an example of a process that provides a system time clock trick mode according to the present invention.

FIG. 7 shows a flowchart illustrating an example of a process that provides an STC trick mode according to the present invention. In step 510, a trick mode rate is selected. The rate can be selected by, for example, a host or a user. If the rate is faster than the regular playback rate, then a fast motion mode may have been selected. If the rate is slower than the regular playback rate, then a slow motion mode may have been selected. The degree of the fast motion or the slow motion is dependent upon the trick mode rate in relation to the regular playback rate. In addition, the selected host trick rate and the regular playback rate need not be integer multiples of each other. If the trick mode rate is very small (e.g., approximately zero) in relation to the regular playback rate, then a pause mode may have been selected. If the trick mode rate is approximately equal to the regular playback rate, then a regular playback mode may have been selected. In step 520, the STC update rate is adjusted in light of selected trick mode rate to create the requested trick mode. For example, the STC update rate may be set equal to the selected trick mode rate or may be set equal to a value that is a function of the selected trick mode rate. The STC update may affect (e.g., update) at least one of the system STC, video STC and audio STC. In step 530, buffers are kept from underflowing or overflowing. In one example, in fast motion mode, the video decoder may be throttled as needed such that the video decoder buffer does not overflow. In another example, in slow motion mode, the video decoder may be throttled as needed such that the video decoder buffer does not underflow.

Figure 8:
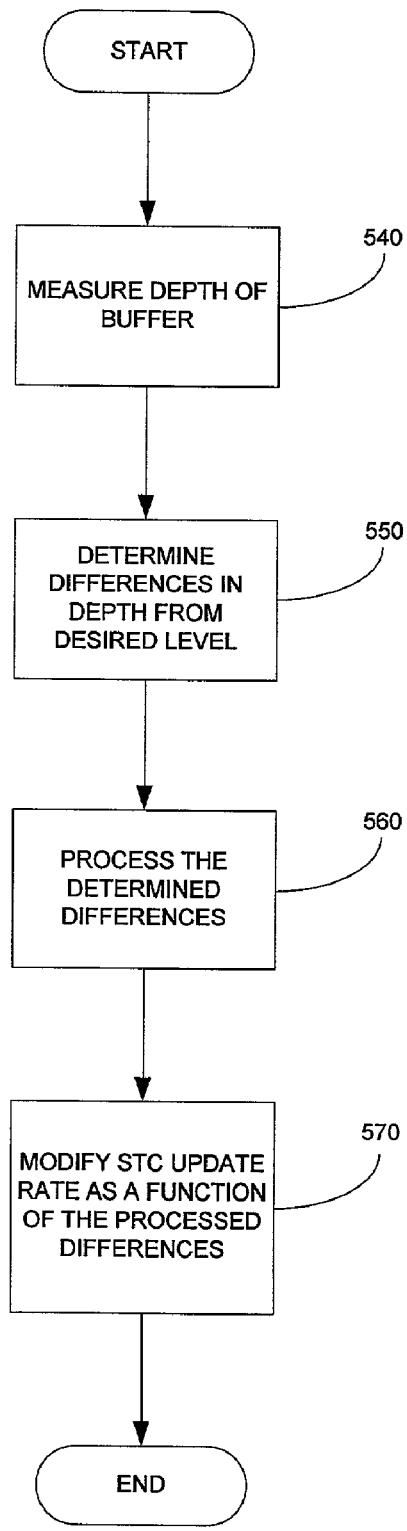
FIG. 8 is a flowchart illustrating an example of a process that provides a system time clock trick mode according to the present invention.

FIG. 8 shows a flowchart illustrating an example of a process that provides a system time clock trick mode according to the present invention. In step 540, depth of the buffers is measured, for example, a number of times over a particular time period. For example, the depths of the audio FIFO and/or the video FIFO may be measured. In step 550, differences are determined between the measured depths and the desired depth over a time period. In step 560, the measurements are processed. For example, the process may include filtering the measurements and integrating the filtered measurements over time (e.g., the time period). In step 570, the STC update rate can be modified as a function of the processed measurements. In one example, the change in the STC update rate reduces the risk that the buffers may overflow or underflow. After the change in the STC update rate, the depth of the buffers is adjusted. In one example, this may avoid the overflowing or the underflowing of the audio FIFO and/or the video FIFO. Such a process may also enable, for example, the replacement of the VCXO with a fixed crystal. In addition, such a process may also enable, for example, receiving transport streams over bursty networks (e.g., a digital subscriber line (DSL)) when program clock references (PCRs) are not valid.

The data flow of the streams through the device may be exactly as it is for a playback of a stream without trick modes. Audio/video synchronization may be achieved just as it is with a normal playback. A difference may be that, in normal playback, the data transport engine STC, video decoder STC and audio decoder STC are all incremented by, for example, a voltage controlled crystal oscillator (VCXO) at an approximately 27 MHz frequency; however, during an STC trick mode, the STCs in the system are synchronously updated by a programmable amount. This may result in a faster or a slower consumption and decode of data and may result in a trick mode to the user. The present invention may also contemplate using a crystal oscillator instead of the VCXO using conventional digital techniques to adjust the frequency output of the crystal oscillator. A few illustrative STC trick modes are discussed below.

(1) Pause—All of the STCs are frozen (i.e. they are no longer incremented by the 27 MHz clock). The video decoder core stops decoding while it waits for the next decode time stamp (DTS) in the system to mature, thus freezing the display displaying the last picture with a mature PTS (i.e., the display is paused at the last picture with a mature PTS). The audio decoder may also stop decoding audio frames while it waits for the next DTS/PTS to mature in the stream, thus causing audio to pause as well. By simply enabling the STCs to begin to update again, DTS/PTS maturing in both the video and audio decompression cores is achieved, and full standard playback begins again.

(2) Frame advance—After a pause, for example, the STC may be updated by one frame time. Thus, the timestamps for one frame mature and the frame is displayed. The audio may or may not be muted during a frame advance. If it is not muted, then any audio frames that mature during this frame advance may be decoded and displayed and may result in a burst of audio at the output of the device.

(3) Slow motion—The STCs in the system may be configured to update at a rate slower than, for example, 27 MHz. For example, the VCXO can be programmed to a lower frequency or using conventional digital techniques, the output of a fixed crystal oscillator can be manipulated to a desired frequency lower than 27 MHz. The video decoder may continue to decode and to display video frames as they mature, however the frames mature at a slower rate. Thus, the result is a slow motion video decode in which the slow motion rate corresponds with the ratio of the actual STC update frequency to the typical 27 MHz frequency. In one example, the STCs may be clocked with a frequency (e.g., approximately 13.5 MHz) that is half the frequency of the normal playback (e.g., approximately 27 MHz). The result may be a slow motion trick mode that plays back at half the speed of normal playback. The audio decoder may also decode frames as they mature. This may result in frames of audio being decoded and displayed with periods of silence between them. The audio decoder output may or may not be muted.

(4) Smooth fast forward—In this case, the STCs may be updated at a frequency faster than, for example, 27 MHz. Thus, the fast forward speed need not be limited to integer multiples of regular playback speed. For the video decoder, frames may be decoded and displayed as they mature. Since the frames may mature at a faster rate than the decoder can display them (since the display rate may not be changing as a function of the STC update frequency), a situation may arise in which at least one frame may have a mature DTS/PTS, yet there may be no available frame buffer into which the at least one frame may be decoded. In one example, the mature frame may be dropped as part of an error recovery algorithm of the decoder. The net result may be, for example, a smooth fast forward video.

Audio may employ in a comparable system and method. For example, as an audio frame matures, it may be decoded and displayed. Frames may be dropped, for example, as part of an error resilience algorithm, when they become too old to be displayed. The net result may be a series of audio frames decoded and displayed at the proper rate with some frames missing in between them (e.g., dropped frames may have been too old) to create a simple fast forward effect.

In addition, the audio decoder may be configured to decode a particular number of audio frames in a row automatically (e.g., throttled by the display buffer depth) after a valid DTS/PTS maturity. Thus, instead of checking every DTS/PTS pair for maturity, the audio transport processor is configured to ignore a programmable number of audio timestamps after a mature frame is found, creating an audio window that may be larger than one audio frame. This feature may be employed in the audio smooth fast forward STC mode. In one example, when a timestamp matures, a series of frames (e.g., a programmable number of frames) are decoded and displayed (e.g., throttled only by the display buffer). Thus, larger groupings than just one frame may be decoded and displayed, resulting in a more audibly pleasing mode of operation for many systems. In another example, to reduce the risk of input buffer overflow into the audio decoder, the frame decode duration is a function of, for example, the selected smooth fast forward rate. Thus, for example, a larger smooth fast forward rate may benefit from a larger audio frame decode window to reduce the risk of buffer underflow.

Thus, it is seen that systems and methods that manipulate a system time clock are provided. One skilled in the art will appreciate that the present invention can be practiced by other than the preferred embodiments which are presented in this description for purposes of illustration and not of limitation, and that the present invention is limited only by the claims that follow. It is noted that equivalents for the particular embodiments discussed in this description may practice the present invention as well.

What is claimed is:

1. A method for providing a trick mode in a personal video recording (PVR) system, comprising the steps of:
    selecting a trick mode rate; and
    adjusting a system time clock (STC) update rate as a function of the selected trick mode rate, the decoding of audio and video information by the PYR system during trick mode playback governed by the STC.

2. The method according to claim 1, wherein selecting a trick mode rate comprises selecting the trick mode rate via a host or via a user.

3. The method according to claim 1, wherein selecting a trick mode rate comprises choosing a faster rate than a regular playback rate to select a fast motion mode.

4. The method according to claim 3, wherein the faster rate is not an integer multiple of the regular playback rate.

5. The method according to claim 3, wherein the regular playback rate is approximately 27 MHz.

6. The method according to claim 1, wherein the selecting a trick mode rate comprises choosing a slower rate than a regular playback rate to select a slow motion mode.

7. The method according to claim 1, wherein the selecting a trick mode rate comprises choosing a rate that is substantially smaller than a regular playback rate to select a pause mode.

8. The method according to claim 7, wherein the chosen rate is approximately 0 Hz.

9. The method according to claim 1, further comprising adjusting at least one of a video STC and an audio STC.

10. The method according to claim 1, further comprising:
    determining depth of a decoder buffer; and
    responsive to the determined decoder buffer depth, acting to keep the decoder buffer from underflowing or overflowing.

11. The method according to claim 10, wherein acting to keep the decoder buffer from underflowing or overflowing comprises increasing or decreasing an update rate of at least one of a system STC, a video STC and an audio STC.

12. The method according to claim 10, wherein acting to keep the decoder buffer from underflowing or overflowing comprises throttling a decoding rate.

13. The method according to claim 10, wherein acting to keep the decoder buffer from underflowing or overflowing comprises using a pause signal line to stop a flow of data.

14. The method according to claim 1, further comprising:
    waiting for a time stamp associated with a first frame to mature; and
    responsive to maturation of the time stamp, displaying the first frame and a programmable number of frames subsequent to the first frame without waiting for maturation of time stamps associated with the programmable number of frames.

15. A method for providing a trick mode in a personal video recording system, the method comprising:
    measuring depths of a buffer over a particular time period;
    determining differences between the measured depths of the buffer and a desired depth of the buffer;
    processing the determined differences; and
    modifying an STC update rate as a function of the processed differences.

16. The method according to claim 15, wherein measuring depths of a buffer over a particular time period comprises sampling the depth of the buffer a plurality of times over the particular time period.

17. The method according to claim 15, wherein the buffer comprises at least one of an audio buffer and a video buffer.

18. The method according to claim 17, wherein the audio buffer is an audio first-in-first-out (FIFO) memory and the video buffer is a video FIFO memory.

19. The method according to claim 15, wherein the buffer is a decoder buffer.

20. The method according to claim 15, wherein processing the determined differences comprises filtering the determined differences.

21. The method according to claim 20, wherein processing the determined differences further comprises integrating the filtered differences.

22. The method according to claim 15, wherein the processing the determined differences comprises integrating the determined differences.

23. The method according to claim 15, further comprising, along with modifying the STC update rate, adjusting the depth of the buffer.

24. The method according to claim 15, wherein the modifying an STC update rate comprises modifying the STC update rate in a manner that avoids overflowing or underflowing the buffer.

25. The method according to claim 15, further comprising receiving a transport stream from a bursty data source.

26. The method according to claim 25, wherein the bursty data source is a digital subscriber line network.

27. The method according to claim 15, wherein the STC update rate is driven by at least one of a voltage controlled crystal oscillator and a fixed crystal oscillator.

28. The method according to claim 15, wherein determining differences between the measured depths of the buffer and a desired depth of the buffer comprises filtering the measured depths.

29. The method according to claim 15, wherein determining differences between the measured depths of the buffer and a desired depth of the buffer comprises filtering the measured depths and integrating the filtered measured depths over time.

30. The method according to claim 15, wherein determining differences between the measured depths of the buffer and a desired depth of the buffer comprises integrating the measured depths over time.

31. The method according to claim 15, further comprising achieving audio/video synchronization in a same manner during a trick mode as during a normal playback.

32. The method according to claim 15, further comprising flowing audio/video stream data in a same manner during a trick mode as during a normal playback.

33. The method according to claim 15, further comprising dropping a mature frame for decoder error recovery.

34. The method according to claim 15, further comprising decoding a series of frames in response to maturation of a single timestamp.

35. At least one circuit for providing a trick mode in a personal video recording system, the at least one circuit operable to, at least:
measure depths of a buffer over a particular time period;
determine differences between the measured depths of the buffer and a desired depth of the buffer;
process the determined differences; and
modify an STC update rate as a function of the processed differences.

36. The at least one circuit of claim 35, wherein the at least one circuit is operable to measure depths of a buffer over a particular time period by, at least in part, sampling the depth of the buffer a plurality of times over the particular time period.

37. The at least one circuit of claim 35, wherein the at least one circuit is operable to process the determined differences by, at least in part, filtering the determined differences.

38. The at least one circuit of claim 37, wherein the at least one circuit is operable to process the determined differences by, at least in part, integrating the filtered differences.

39. The at least one circuit of claim 35, wherein the at least one circuit is operable to process the determined differences by, at least in part, integrating the determined differences.

40. The at least one circuit of claim 35, wherein the at least one circuit is operable to adjust the depth of the buffer, along with modifying the STC update rate.

41. The at least one circuit according to claim 35, wherein the at least one circuit is operable to determine differences between the measured depths of the buffer and a desired depth of the buffer by, at least in part, filtering the measured depths.

42. The at least one circuit according to claim 35, wherein the at least one circuit is operable to determine differences between the measured depths of the buffer and a desired depth of the buffer by, at least in part, filtering the measured depths and integrating the filtered measured depths over time.

43. The at least one circuit according to claim 35, wherein the at least one circuit is operable to determine differences between the measured depths of the buffer and a desired depth of the buffer by, at least in part, integrating the measured depths over time.

44. The at least one circuit according to claim 35, wherein the at least one circuit is further operable to, at least, drop a mature frame for decoder error recovery.

45. The at least one circuit according to claim 35, wherein the at least one circuit is further operable to, at least, decode a series of frames in response to maturation of a single timestamp.

46. A method for providing a trick mode in a personal video recording system, the method comprising:
measuring depths of a buffer over a particular time period;
processing the difference between the measured buffer depths and a desired buffer depth; and
modifying an STC update rate as a function of the processed difference.

47. The method of claim 46, wherein processing the difference between the measured buffer depths and a desired buffer depth comprises determining differences between the measured buffer depths and the desired buffer depth.

48. The method of claim 47, wherein processing the difference between the measured buffer depths and a desired buffer depth comprises filtering the determined differences.

49. The method of claim 47, wherein processing the difference between the measured buffer depths and a desired buffer depth comprises integrated the determined differences.

* * * * *